(12) United States Patent
Layouni et al.

(10) Patent No.: US 12,363,216 B2
(45) Date of Patent: Jul. 15, 2025

(54) ESTABLISHING A CONNECTION BETWEEN A MOBILE DEVICE AND A VEHICLE

(71) Applicant: GM Global Technology Operations LLC, Detroit, MI (US)

(72) Inventors: Mohamed A. Layouni, Fraser, MI (US); Markus Jochim, Troy, MI (US); Thomas M. Forest, Macomb, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 429 days.

(21) Appl. No.: 18/045,481

(22) Filed: Oct. 11, 2022

(65) Prior Publication Data

US 2024/0121334 A1    Apr. 11, 2024

(51) Int. Cl.
| | |
|---|---|
| *H04M 1/72412* | (2021.01) |
| *G06F 3/0484* | (2022.01) |
| *G06F 3/0488* | (2022.01) |
| *G06F 3/16* | (2006.01) |
| *G10L 13/02* | (2013.01) |
| *G10L 15/22* | (2006.01) |
| *H04M 1/60* | (2006.01) |
| *H04W 12/06* | (2021.01) |

(52) U.S. Cl.
CPC ........ *H04M 1/6091* (2013.01); *G06F 3/0484* (2013.01); *G06F 3/0488* (2013.01); *G06F 3/167* (2013.01); *G10L 13/02* (2013.01); *G10L 15/22* (2013.01); *H04M 1/72412* (2021.01); *H04W 12/06* (2013.01); *G10L 2015/223* (2013.01); *H04M 2250/04* (2013.01)

(58) Field of Classification Search
CPC ........... H04W 4/40; H04W 4/44; H04W 4/46; G08G 1/166; B60R 16/023; B60R 2325/205
See application file for complete search history.

(56) References Cited

U.S. PATENT DOCUMENTS

| | | | |
|---|---|---|---|
| 11,035,688 B2* | 6/2021 | Moore | H04W 4/12 |
| 11,093,767 B1* | 8/2021 | Argenti | B60W 40/09 |
| 2019/0171218 A1* | 6/2019 | Hammond | G05D 1/0223 |
| 2020/0004397 A1* | 1/2020 | Zhang | G06F 8/38 |
| 2023/0142904 A1* | 5/2023 | Komich | G06F 40/279 |
| | | | 704/235 |
| 2023/0356728 A1* | 11/2023 | Jain | G06F 3/013 |

* cited by examiner

*Primary Examiner* — Khalid W Shaheed
(74) *Attorney, Agent, or Firm* — Vivacqua Crane, PLLC

(57) ABSTRACT

A system for establishing a wireless connection between a mobile device and a vehicle includes a human-machine interface (HMI), a vehicle communication system, where the vehicle communication system includes a wireless connection transceiver, a speaker, a microphone, a controller in electrical communication with the HMI, the vehicle communication system, the speaker, and the microphone. The controller is programmed to activate a wireless connection mode of the controller based at least in part on a signal from the microphone and transmit a vehicle wireless connection identifier using the speaker. The controller is further programmed to confirm a vehicle wireless connection passcode using at least one of the speaker and the microphone and establish a wireless connection between the mobile device and the controller using the wireless connection transceiver in response to confirming the vehicle wireless connection passcode.

17 Claims, 8 Drawing Sheets

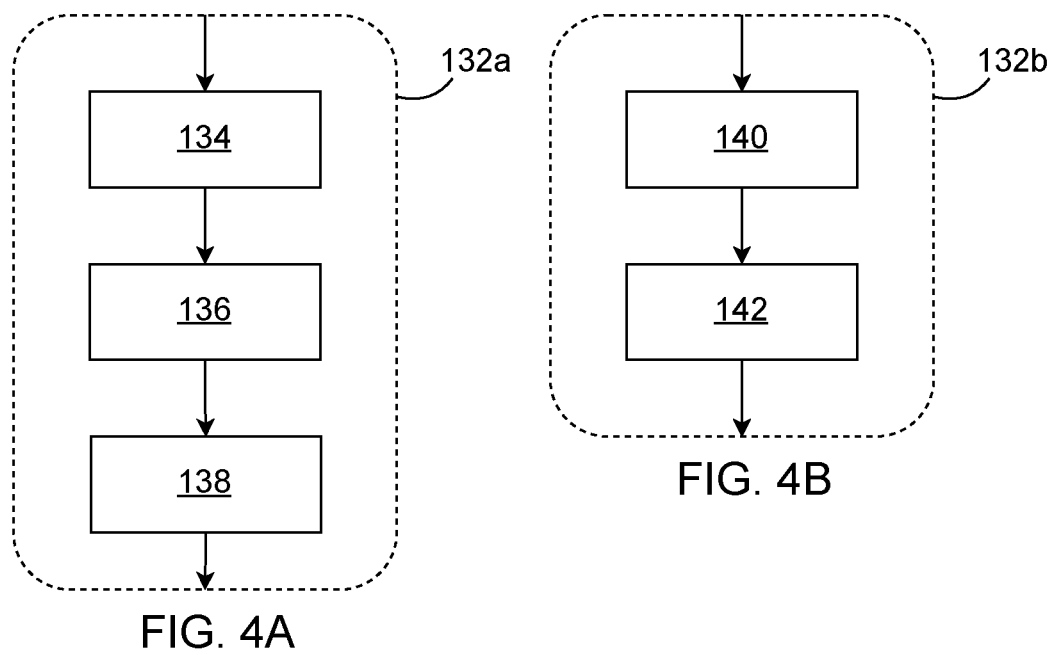
FIG. 4A
FIG. 4B
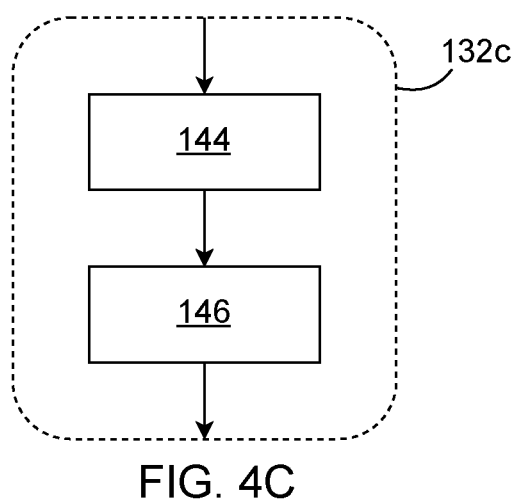
FIG. 4C ns and methods for
establishing a connection between a mobile device and a
vehicle is provided. The system includes a human-machine interface
(HMI), a vehicle communication system, where the vehicle
communication system includes a wireless connection transceiver, a speaker, a microphone, a controller in electrical
communication with the HMI, the vehicle communication
system, the speaker, and the microphone. The controller is
programmed to activate a wireless connection mode of the
controller based at least in part on a signal from the
microphone and transmit a vehicle wireless connection
identifier using the speaker. The controller is further programmed to confirm a vehicle wireless connection passcode
using at least one of the speaker and the microphone and
establish a wireless connection between the mobile device
and the controller using the wireless connection transceiver
in response to confirming the vehicle wireless connection
passcode.

ESTABLISHING A CONNECTION BETWEEN A MOBILE DEVICE AND A VEHICLE

INTRODUCTION

The present disclosure relates to systems and methods for establishing a connection between a mobile device and a vehicle.

To enhance the vehicle occupant experience, vehicles may be equipped with human-machine interface (HMI) systems to allow occupants to control and interact with features and settings of the vehicle. Using the HMI system, occupants may control, for example, entertainment features of the vehicle such as media playback. In some cases, occupants may wish to connect a mobile device (e.g., a smartphone) to the HMI system in order to provide enhanced capabilities to the HMI system. For example, the mobile device may include media which may be accessed by the HMI system and played in the vehicle. Systems and methods have been developed to establish a connection between a mobile device and a vehicle. However, current systems and methods may require more involved interaction from occupants. Therefore, using current systems and methods to establish a connection between a mobile device and a vehicle may be challenging for impaired occupants, such as, for example, visually-impaired occupants.

Thus, while current systems and methods to connect mobile devices to vehicle systems achieve their intended purpose, there is a need for a new and improved system and method to establish a connection between a mobile device and a vehicle.

SUMMARY

According to several aspects, a system for establishing a wireless connection between a mobile device and a vehicle is provided. The system includes a human-machine interface (HMI), a vehicle communication system, where the vehicle communication system includes a wireless connection transceiver, a speaker, a microphone, a controller in electrical communication with the HMI, the vehicle communication system, the speaker, and the microphone. The controller is programmed to activate a wireless connection mode of the controller based at least in part on a signal from the microphone and transmit a vehicle wireless connection identifier using the speaker. The controller is further programmed to confirm a vehicle wireless connection passcode using at least one of the speaker and the microphone and establish a wireless connection between the mobile device and the controller using the wireless connection transceiver in response to confirming the vehicle wireless connection passcode.

In another aspect of the present disclosure, to activate the wireless connection mode of the controller, the controller is further programmed to receive the signal from the microphone and analyze the signal from the microphone to identify a voice command spoken by an occupant of the vehicle. To activate the wireless connection mode of the controller, the controller is further programmed to determine a requested action based on the voice command spoken by the occupant of the vehicle and activate the wireless connection mode of the controller in response to determining that the requested action includes activation of the wireless connection mode of the controller.

In another aspect of the present disclosure, to transmit the vehicle wireless connection identifier, the controller is further programmed to retrieve the vehicle wireless connection identifier from a non-transitory memory of the controller. To transmit the vehicle wireless connection identifier, the controller is further programmed to synthesize an artificial human speech segment including the vehicle wireless connection identifier and announce the artificial human speech segment including the vehicle wireless connection identifier to an occupant of the vehicle using the speaker.

In another aspect of the present disclosure, to confirm the vehicle wireless connection passcode, the controller is further programmed to compute the vehicle wireless connection passcode, synthesize an artificial human speech segment including the vehicle wireless connection passcode, and announce the artificial human speech segment including the vehicle wireless connection passcode using the speaker. To confirm the vehicle wireless connection passcode, the controller is further programmed to determine a matching status between the vehicle wireless connection passcode and a mobile device wireless connection passcode, where the matching status includes an identical status and a non-identical status and confirm the vehicle wireless connection passcode in response to determining that the matching status is the identical status.

In another aspect of the present disclosure, to determine the matching status, the controller is further programmed to prompt an occupant of the vehicle to provide the matching status of the vehicle wireless connection passcode and the mobile device wireless connection passcode.

In another aspect of the present disclosure, to determine the matching status, the mobile device is configured to compare the vehicle wireless connection passcode to the mobile device wireless connection passcode to determine the matching status.

In another aspect of the present disclosure, to confirm the vehicle wireless connection passcode, the controller is further programmed to compute the vehicle wireless connection passcode and receive a mobile device wireless connection passcode using the microphone. To confirm the vehicle wireless connection passcode, the controller is further programmed to determine a matching status between the vehicle wireless connection passcode and the mobile device wireless connection passcode by comparing the vehicle wireless connection passcode to the mobile device wireless connection passcode, where the matching status includes an identical status and a non-identical status. To confirm the vehicle wireless connection passcode, the controller is further programmed to confirm the vehicle wireless connection passcode in response to determining that the matching status is the identical status.

According to several aspects, a system for establishing a wireless connection between a mobile device and a vehicle is provided. The system includes a human-machine interface (HMI), a vehicle communication system, where the vehicle communication system includes a wireless connection transceiver, and a controller in electrical communication with the HMI and the vehicle communication system. The controller is programmed to activate a wireless connection mode of the controller based on a signal from at least one of the vehicle communication system and the HMI. The controller is further programmed to transmit a vehicle wireless connection identifier using the vehicle communication system and confirm a vehicle wireless connection passcode using the vehicle communication system. The controller is further programmed to establish a wireless connection between the mobile device and the controller using the wireless connection transceiver in response to confirming the vehicle wireless connection passcode.

In another aspect of the present disclosure, the vehicle communication system further includes a universal serial bus (USB) interface. To activate the wireless connection mode of the controller, the controller is further programmed to monitor a mobile device connection status of the USB interface, where the mobile device connection status includes a connected status and disconnected status. To activate the wireless connection mode of the controller, the controller is further programmed to transmit a user interface of the HMI to the mobile device using the USB interface in response to determining that the mobile device connection status is the connected status. To activate the wireless connection mode of the controller, the controller is further programmed to activate the wireless connection mode of the controller based at least in part on a signal transmitted by the mobile device using the USB interface.

In another aspect of the present disclosure, the mobile device is configured to display the user interface of the HMI transmitted using the USB interface.

In another aspect of the present disclosure, to activate the wireless connection mode of the controller, the controller is further programmed to monitor a portion of a touchscreen of the HMI and activate the wireless connection mode of the controller in response to detecting a predetermined number of touches in the portion of the touchscreen of the HMI.

In another aspect of the present disclosure, the vehicle communication system further includes a universal serial bus (USB) interface. To activate the wireless connection mode of the controller, the controller is further programmed to monitor a mobile device connection status of the USB interface, where the mobile device connection status includes a connected status and disconnected status. To activate the wireless connection mode of the controller, the controller is further programmed to activate the wireless connection mode of the controller in response to determining that the mobile device connection status is the connected status.

In another aspect of the present disclosure, the vehicle communication system further includes a near-field communication (NFC) transceiver. To transmit the vehicle wireless connection identifier, the controller is further programmed to transmit the vehicle wireless connection identifier to the mobile device using the NFC transceiver.

In another aspect of the present disclosure, the vehicle communication system further includes a near-field communication (NFC) transceiver. To confirm the vehicle wireless connection passcode, the controller is further programmed to transmit the vehicle wireless connection passcode to the mobile device using the NFC transceiver. To confirm the vehicle wireless connection passcode, the controller is further programmed to determine a matching status between the vehicle wireless connection passcode and a mobile device wireless connection passcode, where the matching status includes an identical status and a non-identical status. To confirm the vehicle wireless connection passcode, the controller is further programmed to confirm the vehicle wireless connection passcode in response to determining that the matching status is the identical status.

In another aspect of the present disclosure, to determine the matching status, controller is further programmed to receive the matching status from the mobile device using the NFC transceiver, where the mobile device is configured to determine the matching status by comparing the vehicle wireless connection passcode to the mobile device wireless connection passcode and transmit the matching status to the NFC transceiver.

In another aspect of the present disclosure, the vehicle communication system further includes a refreshable braille display. To confirm the vehicle wireless connection passcode, the controller is further programmed to display the vehicle wireless connection passcode on the refreshable braille display. To confirm the vehicle wireless connection passcode, the controller is further programmed to determine a matching status of the vehicle wireless connection passcode and a mobile device wireless connection passcode, where the matching status includes an identical status and a non-identical status. To confirm the vehicle wireless connection passcode, the controller is further programmed to confirm the vehicle wireless connection passcode in response to determining that the matching status is the identical status.

In another aspect of the present disclosure, to determine the matching status, the controller is further programmed to prompt an occupant of the vehicle to provide the matching status of the vehicle wireless connection passcode and the mobile device wireless connection passcode.

According to several aspects, a method for establishing a wireless connection between a mobile device and a vehicle is provided. The method includes activating a wireless connection mode of the vehicle based on a signal from a universal serial bus (USB) interface of the vehicle and transmitting a vehicle wireless connection identifier to the mobile device using a camera of the mobile device in response to activating the wireless connection mode of the vehicle. The method further includes monitoring a wireless connection transceiver for an incoming wireless connection request and transmitting a vehicle wireless connection passcode to the mobile device using the camera of the mobile device in response to receiving an incoming wireless connection request. The method further includes confirming the vehicle wireless connection passcode using the mobile device and establishing a wireless connection between the mobile device and the vehicle in response to confirming the vehicle wireless connection passcode.

In another aspect of the present disclosure, activating the wireless connection mode of the vehicle further may include transmitting a user interface of the vehicle to a mobile device using a universal serial bus (USB) interface. Activating the wireless connection mode of the vehicle further may include displaying the user interface of the vehicle on the mobile device, where a user may interact with the user interface to activate a wireless connection mode of the vehicle. Transmitting the vehicle wireless connection identifier to the mobile device further may include displaying a wireless connection identifier on a touchscreen of the vehicle in response to the user activating the wireless connection mode of the vehicle. Transmitting the vehicle wireless connection identifier to the mobile device further may include receiving the vehicle wireless connection identifier on the mobile device using a camera of the mobile device.

In another aspect of the present disclosure, transmitting the vehicle wireless connection passcode to the mobile device further may include displaying an image on a touchscreen of the vehicle in response to receiving an incoming wireless connection request from the mobile device, where the image encodes the vehicle wireless connection passcode. Transmitting the vehicle wireless connection passcode to the mobile device further may include receiving the vehicle wireless connection passcode using the camera of the mobile device. Confirming the vehicle wireless connection passcode using the mobile device further may include comparing the vehicle wireless connection passcode to a mobile device wireless connection passcode. Establishing the wireless connection between the mobile device and the vehicle further may include establishing a wireless connection between the vehicle and the mobile device in response to determining that the vehicle wireless connection passcode is identical to the mobile device wireless connection passcode.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 4A is a flowchart of a first method for transmitting a vehicle wireless connection identifier to a mobile device according to an exemplary embodiment;

FIG. 4B is a flowchart of a second method for transmitting a vehicle wireless connection identifier to a mobile device according to an exemplary embodiment;

FIG. 4C is a flowchart of a third method for transmitting a vehicle wireless connection identifier to a mobile device according to an exemplary embodiment;

DETAILED DESCRIPTION

The following description is merely exemplary in nature and is not intended to limit the present disclosure, application, or uses.

Figure 1A:
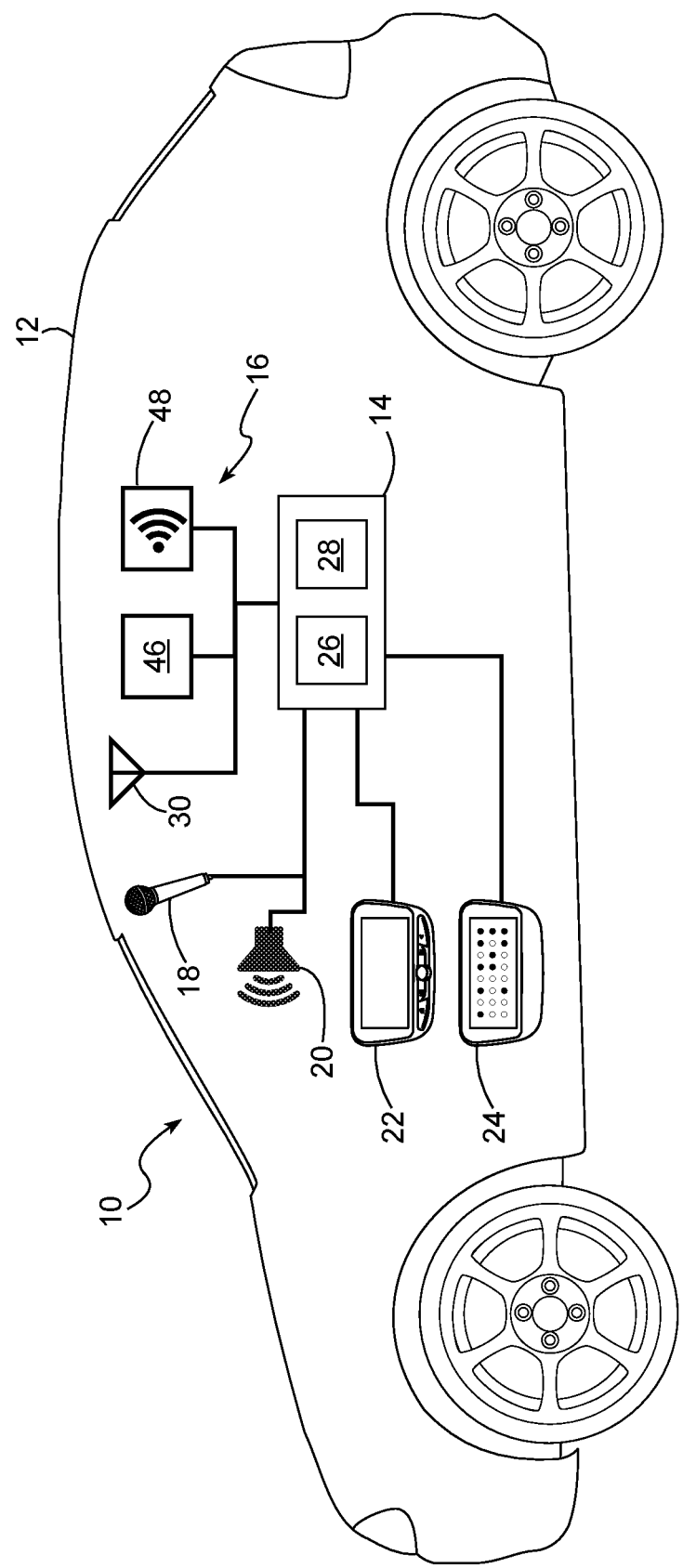
FIG. 1A is a schematic diagram of a system for establishing a wireless connection between a mobile device and a vehicle according to an exemplary embodiment.

Referring to FIG. 1A, a system for establishing a wireless connection between a mobile device and a vehicle is illustrated and generally indicated by reference number 10. The system 10 is shown with an exemplary vehicle 12. While a passenger vehicle is illustrated, it should be appreciated that the vehicle 12 may be any type of vehicle without departing from the scope of the present disclosure. The system 10 generally includes a controller 14, a vehicle communication system 16, a microphone 18, a speaker 20, a human-machine interface (HMI) 22, and a refreshable braille display (RBD) 24.

The controller 14 is used to implement a method 100 for establishing a wireless connection between the mobile device and a vehicle using the system 10, as will be described below. The controller 14 includes at least one processor 26 and a non-transitory computer readable storage device or media 28. The processor 26 may be a custom made or commercially available processor, a central processing unit (CPU), a graphics processing unit (GPU), an auxiliary processor among several processors associated with the controller 14, a semiconductor-based microprocessor (in the form of a microchip or chip set), a macroprocessor, a combination thereof, or generally a device for executing instructions. The computer readable storage device or media 28 may include volatile and nonvolatile storage in read-only memory (ROM), random-access memory (RAM), and keep-alive memory (KAM), for example. KAM is a persistent or non-volatile memory that may be used to store various operating variables while the processor 26 is powered down. The computer-readable storage device or media 28 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the controller 14 to control various systems of the vehicle 12. The controller 14 may also consist of multiple controllers which are in electrical communication with each other.

The controller 14 is in electrical communication with the vehicle communication system 16, the microphone 18, the speaker 20, the HMI 22, and the RBD 24. The electrical communication may be established using, for example, a CAN bus, a Wi-Fi network, a cellular data network, or the like. It should be understood that various additional wired and wireless techniques and communication protocols for communicating with the controller 14 are within the scope of the present disclosure.

The vehicle communication system 16 is used to allow the controller 14 to communicate with systems and devices in a vicinity of the vehicle 12. The vehicle communication system 16 includes a wireless connection transceiver 30, a universal serial bus (USB) interface 46, and a near-field communication (NFC) transceiver 48. The vehicle communication system 16 is in electrical communication with the controller 14 as described above.

Figure 1B:
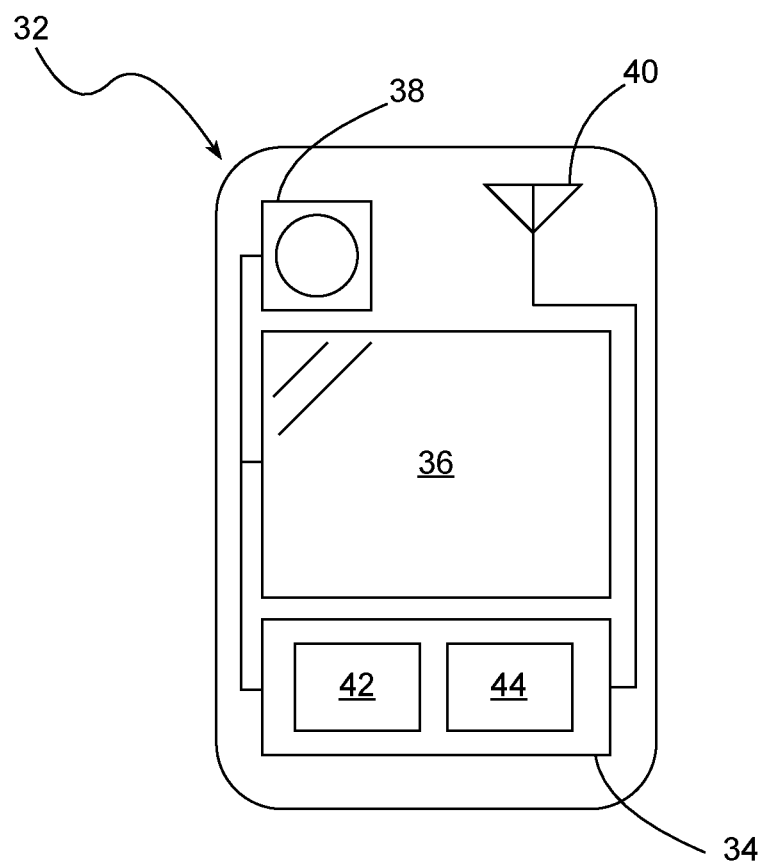
FIG. 1B is a schematic diagram of a mobile device according to an exemplary embodiment.

The wireless connection transceiver 30 is used to establish a wireless connection with the mobile device 32 (FIG. 1B). In the scope of the present disclosure, the mobile device 32 includes, for example, a cellular telephone, a smartphone, a tablet, and/or a computer. In the exemplary embodiment shown in FIG. 1B, the mobile device 32 is a smartphone. Additional computing devices having wireless connection capability are also within the scope of the present disclosure. In an exemplary embodiment, the wireless connection transceiver 30 includes capability to establish a wireless connection using, for example, IEEE 802.11 standards (e.g., WLAN), cellular communication protocols, and/or wireless personal area network protocols (e.g., Bluetooth®).

Referring to FIG. 1B, the mobile device 32 includes a mobile device controller 34, a mobile device display 36, a mobile device camera 38, and a mobile device communication system 40. Each of the mobile device display 36, the mobile device camera 38, and the mobile device communication system 40 are in electrical communication with the mobile device controller 34.

The mobile device controller 34 controls the operation of the mobile device 32. The mobile device controller 34 includes at least one processor 42 and a non-transitory computer readable storage device or media 44. In a non-limiting example, the processor 42 and media 44 of the mobile device controller 34 are similar in structure and/or function to the processor 26 and the media 28 of the controller 14, as described above.

The mobile device display 36 is used to display information to the occupant. The mobile device display 36 is capable of displaying text, graphics, and/or images. It is to be understood that the mobile device display 36 may include an LCD display, LED display, and/or the like without departing from the scope of the present disclosure.

The mobile device camera 38 is used to capture images of an environment surrounding the mobile device 32. In the scope of the present disclosure, the environment refers to the environment external to the mobile device 32 surrounding the mobile device 32. It should be understood that cameras having various sensor types including, for example, charge-coupled device (CCD) sensors, complementary metal oxide semiconductor (CMOS) sensors, and/or high dynamic range (HDR) sensors are within the scope of the present disclosure. Furthermore, cameras having various lens types including, for example, wide-angle lenses and/or narrow-angle lenses are also within the scope of the present disclosure.

The mobile device communication system 40 allows the mobile device controller 34 to communicate with remote systems. In an exemplary embodiment, the mobile device communication system 40 includes a wireless communication system configured to communicate using wireless networks such as a wireless local area network (WLAN) using IEEE 802.11 standards and/or using cellular data communication. Accordingly, in a non-limiting example, the mobile device communication system 40 includes one or more antennas and/or communication transceivers for transmitting and/or receiving signals.

The USB interface 46 is used to establish a wired connection with the mobile device 32. In an exemplary embodiment, the USB interface 46 includes a USB host controller in communication with a USB connector. Thus, an occupant of the vehicle 12 may connect the mobile device 32 to the USB connector, allowing the controller 14 to electrically communicate with the mobile device 32 using the USB interface 46.

The NFC transceiver 48 is used to allow short-range wireless communication between the mobile device 32 and the controller 14. In an exemplary embodiment, the NFC transceiver 48 includes an NFC controller and an NFC antenna in electrical communication with the NFC controller. The NFC controller uses the ECMA-480 and ISO/IEC 18092 standards to communicate with the mobile device 32 via the NFC antenna. In a non-limiting example, the NFC transceiver 48 allows communication with the mobile device 32 from a distance of 4 centimeters or less.

The microphone 18 is used to receive voice commands by converting acoustic waves into electrical signals. In an exemplary embodiment, the microphone 18 includes a unidirectional dynamic microphone (i.e., a microphone which converts acoustic waves to electrical signals using electromagnetic induction) configured to receive voice commands from a specific occupant of the vehicle 12. In another exemplary embodiment, the microphone 18 includes a plurality of microelectromechanical systems (MEMS) microphones (e.g., a microphone having a pressure-sensitive diaphragm etched directly into a silicon wafer) disposed throughout a cabin of the vehicle 12 configured to receive voice commands. It should be understood that additional types of microphones which are configured to convert acoustic waves to electrical signals (e.g., digital and/or analog electrical signals) are included in the scope of the present disclosure. The microphone 18 is in electrical communication with the controller 14 as described above.

The speaker 20 is used to provide audible feedback to the occupant by converting electrical signals to acoustic waves. In an exemplary embodiment, the speaker 20 includes a permanent magnet, a circular coil of wire, and a diaphragm. The circular coil of wire is affixed to the diaphragm and the permanent magnet is disposed along the axis of the circular coil of wire. Electrical currents from an audio signal passing through the circular coil of wire induce electromotive forces which move the diaphragm. The movement of the diaphragm produces acoustic waves in the air surrounding the diaphragm. The speaker 20 is in electrical communication with the controller 14 as described above.

The HMI 22 is a display system located in view of the occupant and capable of displaying text, graphics, and/or images. The HMI 22 displays a user interface (UI). The UI is an interactive collection of text, graphics, and/or images which display information to the occupant of the vehicle 12 and allow the occupant to control features and/or settings of the vehicle 12 and/or the controller 14. It is to be understood that HMI display systems including LCD displays, LED displays, touchscreen displays and the like are within the scope of the present disclosure. Further exemplary embodiments where the HMI 22 is disposed in a rearview mirror are also within the scope of the present disclosure. The HMI 22 is in electrical communication with the controller 14 as discussed above.

The RBD 24 is used to allow the controller 14 to provide information to a vision-impaired occupant. The RBD 24 is an electromechanical device for displaying braille characters. In an exemplary embodiment, the RBD 24 consists of a two-dimensional grid of pins which are raised and/or lowered to display braille characters. In a non-limiting example, the pins are raised and/or lowered by electromechanical actuators, such as, for example, electric motors, solenoids, and/or piezoelectric motors. In a non-limiting example, the RBD 24 is located within reach of the occupant of the vehicle 12, for example, upon a dashboard and/or a center console of the vehicle 12. The RBD 24 is in electrical communication with the controller 14 as discussed above.

Figure 2:
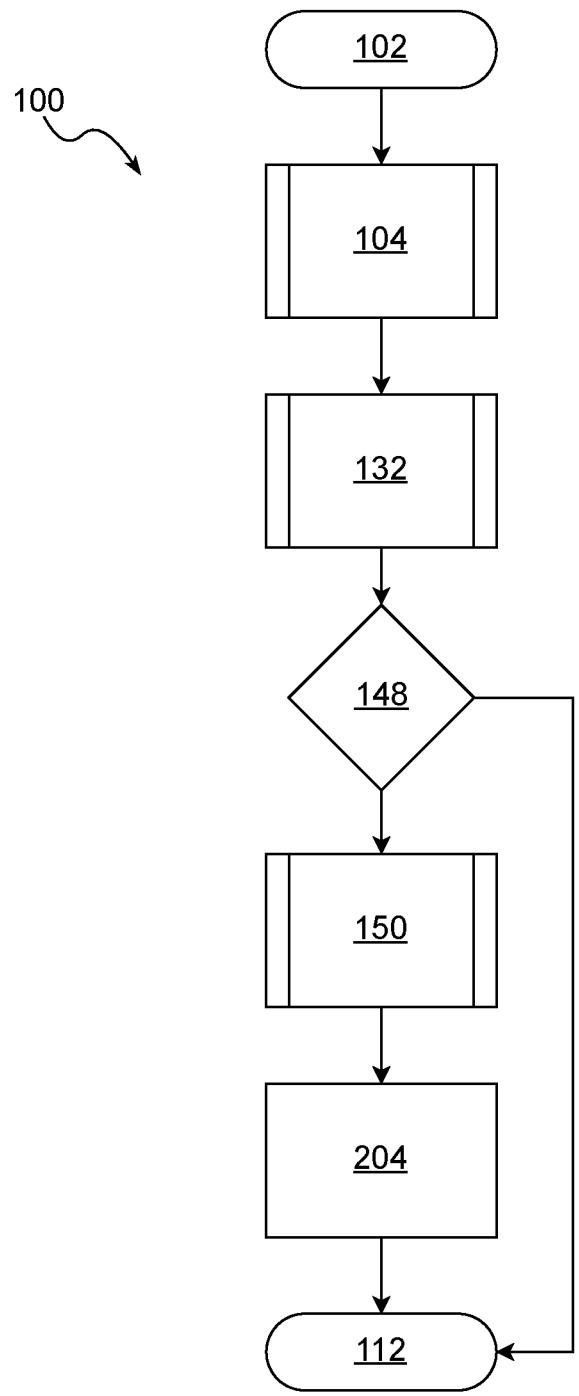
FIG. 2 is a flowchart of a method for establishing a wireless connection between a mobile device and a vehicle according to an exemplary embodiment.

Referring to FIG. 2, a flowchart of the method 100 for establishing a wireless connection between a mobile device 32 and a vehicle 12 is illustrated and generally indicated by reference number 100. The method 100 begins at block 102 and proceeds to block 104. At block 104, a wireless connection mode of the controller 14 is activated. In the scope of the present disclosure, the wireless connection mode is a mode in which the controller 14 is configured to establish new wireless connections using the wireless connection transceiver 30. The present disclosure contemplates at least four alternative methods 104a, 104b, 104c, 104d for activating the wireless connection mode of the controller 14, as will be discussed in reference to FIGS. 3A-3D below.

Figure 3A:
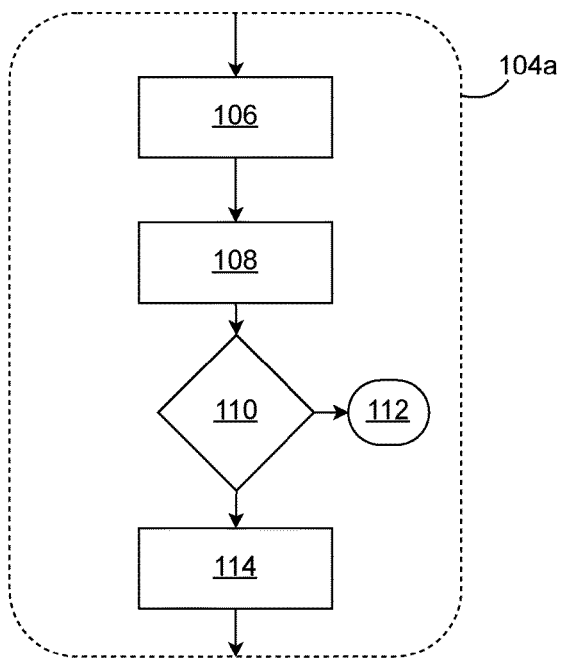
FIG. 3A is a flowchart of a first method for activating a wireless connection mode of a controller according to an exemplary embodiment.

Referring to FIG. 3A, a flowchart of a first method 104a for block 104 is shown. The first method 104a begins at block 106. At block 106, the controller 14 receives a signal from the microphone 18. After block 106, the first method 104a proceeds to block 108. At block 108, the signal received at block 106 is analyzed to identify a voice command spoken by the occupant of the vehicle 12. In an exemplary embodiment, the controller 14 is programmed to identify the voice command using a machine learning algorithm, for example, using a neural network. In a non-limiting example, the machine learning algorithm is trained by providing the algorithm with a plurality of signals containing voice commands which have been pre-identified. After sufficient training of the machine learning algorithm, the algorithm can identify voice commands from signals received from the microphone 18 with a high accuracy and precision. After block 108, the first method 104a proceeds to block 110.

At block 110, a requested action is determined based on the voice command identified at block 108. In an exemplary embodiment, the requested action is determined by comparing the voice command identified at block 108 to a predetermined database of requestable actions. In a non-limiting example, the requested action may include manipulating a feature of the vehicle 12, such as, for example, adjusting a climate control setting of the vehicle 12. If the requested action does not include activating the wireless connection mode of the controller 14, the first method 104a proceeds to enter a standby state at block 112. If the requested action does include activating the wireless connection mode of the controller 14, the first method 104a proceeds to block 114. At block 114, the wireless connection mode of the controller 14 is activated.

Figure 3B:
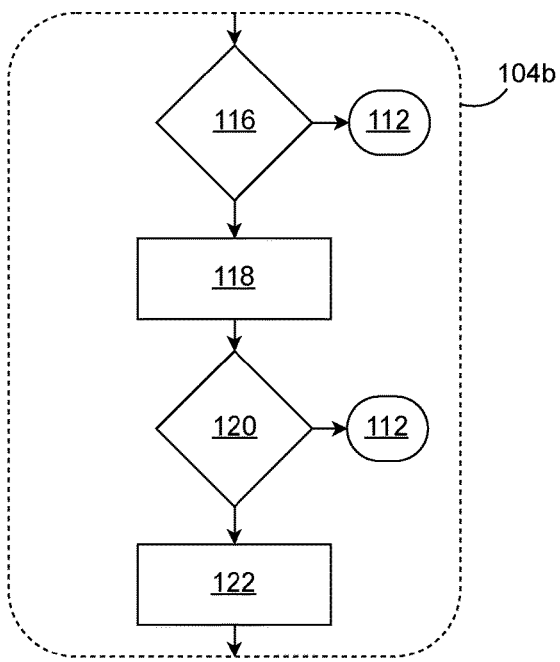
FIG. 3B is a flowchart of a second method for activating a wireless connection mode of a controller according to an exemplary embodiment.

Referring to FIG. 3B, a flowchart of a second method 104b for block 104 is shown. The second method 104b begins at block 116. At block 116, a mobile device 32 connection status of the USB interface 46 is determined. In the scope of the present disclosure, the mobile device 32 connection status indicates whether the mobile device 32 is electrically connected to the USB interface 46. If the mobile device 32 is not connected to the USB interface 46, the second method 104b proceeds to enter a standby state at block 112. If the mobile device 32 is connected to the USB interface 46, the second method 104b proceeds to block 118.

At block 118, the controller 14 transmits the user interface (UI) of the HMI 22 to the mobile device 32 using the USB interface 46. The mobile device 32 is configured to display the UI of the HMI 22, such that the occupant of the vehicle 12 may use the mobile device 32 to control features and/or settings of the vehicle 12 and/or the controller 14. In a non-limiting example, the vision-impaired occupant may use assistance features of the mobile device 32, such as, for example, a screen reader, to control features and/or settings of the vehicle 12 and/or the controller 14. After block 118, the second method 104b proceeds to block 120.

At block 120, the controller 14 monitors the USB interface 46 to receive commands for controlling features and/or settings of the vehicle 12 and/or the controller 14, such as, for example a command to activate the wireless connection mode of the controller 14. If a command to activate the wireless connection mode of the controller 14 is not received, the second method 104b proceeds to enter a standby state at block 112. If a command to activate the wireless connection mode of the controller 14 is received, the second method 104b proceeds to block 122. At block 122, the wireless connection mode of the controller 14 is activated.

Figure 3C:
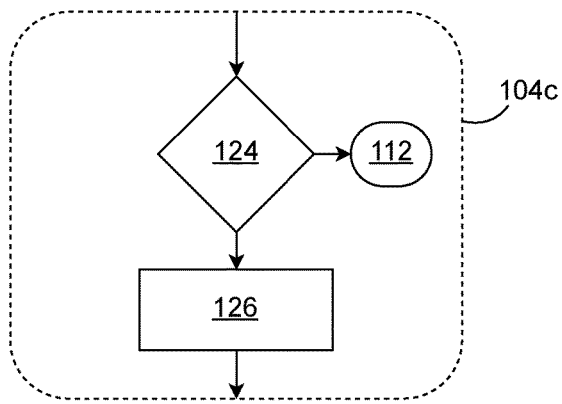
FIG. 3C is a flowchart of a third method for activating a wireless connection mode of a controller according to an exemplary embodiment.

Referring to FIG. 3C, a flowchart of a third method 104c for block 104 is shown. The third method 104c begins at block 124. At block 124, the controller 14 monitors a portion of the HMI 22 to detect a predetermined number of touches in the portion of the HMI 22. In an exemplary embodiment, the portion of the HMI 22 is a bottom right corner portion of the HMI 22, and the predetermined number of touches is five touches. If the predetermined number of touches are not detected, the third method 104c proceeds to enter the standby state at block 112. If the predetermined number of touches are detected, the third method 104c proceeds to block 126. At block 126, the wireless connection mode of the controller 14 is activated.

Figure 3D:
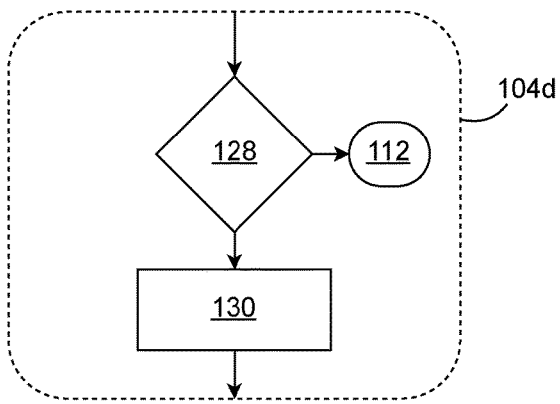
FIG. 3D is a flowchart of a fourth method for activating a wireless connection mode of a controller according to an exemplary embodiment.

Referring to FIG. 3D, a flowchart of a fourth method 104d for block 104 is shown. The fourth method 104d begins at block 128. At block 128, the mobile device 32 connection status of the USB interface 46 is determined. In the scope of the present disclosure, the mobile device 32 connection status indicates whether the mobile device 32 is electrically connected to the USB interface 46. If the mobile device 32 is not connected to the USB interface 46, the fourth method 104d proceeds to enter a standby state at block 112. If the mobile device 32 is connected to the USB interface 46, the fourth method 104d proceeds to block 130. At block 130, the wireless connection mode of the controller 14 is activated.

Referring again to FIG. 2, after preforming at least one of the alternative methods 104a, 104b, 104c, 104d at block 104, the method 100 proceeds to block 132. At block 132, the controller 14 transmits a vehicle wireless connection identifier to the mobile device 32 using the vehicle communication system 16. In the scope of the present disclosure, the vehicle wireless connection identifier is an alphanumerical identifier (i.e., a name) by which the wireless connection transceiver 30 is identified to an external system (e.g., the mobile device 32). In order to establish a connection with the controller 14, the mobile device 32 must use the vehicle wireless connection identifier. The present disclosure contemplates at least three alternative methods 132a, 132b, 132c for transmitting the vehicle wireless connection identifier to the mobile device 32 using the vehicle communication system 16, as will be discussed in reference to FIGS. 4A-4C below.

Referring to FIG. 4A, a flowchart of a first method 132a for block 132 is shown. The first method 132a begins at block 134. At block 134, the controller 14 retrieves the vehicle wireless connection identifier from the media 28 of the controller 14. After block 134, the first method 132a proceeds to block 136.

At block 136, the controller 14 synthesizes an artificial human speech segment including the vehicle wireless connection identifier. In the scope of the present disclosure, the artificial human speech segment is an audio file containing computer-synthesized speech. In an exemplary embodiment, the speech segment is generated using a speech synthesis algorithm. In a non-limiting example, the speech synthesis algorithm may concatenate segments of recorded human speech which are stored in the media 28 of the controller 14. After block 136, the first method 132a proceeds to block 138. At block 138, the artificial human speech segment synthesized at block 136 is announced to the occupant of the vehicle 12 using the speaker 20.

Referring to FIG. 4B, a flowchart of a second method 132b for block 132 is shown. The second method 132b begins at block 140. At block 140, the controller 14 retrieves the vehicle wireless connection identifier from the media 28 of the controller 14. After block 140, the second method 132*b* proceeds to block 142.

At block 142, the controller 14 transmits the vehicle wireless connection identifier to the mobile device 32 using the NFC transceiver 48.

Referring to FIG. 4C, a flowchart of a third method 132*c* for block 132 is shown. The third method 132*c* begins at block 144. At block 144, the controller 14 retrieves the vehicle wireless connection identifier from the media 28 of the controller 14. After block 144, the third method 132*c* proceeds to block 146.

At block 146, the controller 14 displays the vehicle wireless connection identifier on the HMI 22. In a non-limiting example, the visually impaired occupant may use a camera and a screen reading software of the mobile device 32 to receive the vehicle wireless connection identifier from the HMI 22.

Referring again to FIG. 2, after preforming at least one of the alternative methods 132*a*, 132*b*, 132*c* at block 132, the method 100 proceeds to block 148. At block 148, the controller 14 monitors the wireless connection transceiver 30 for an incoming wireless connection request. In the scope of the present disclosure, the incoming wireless connection request occurs when the mobile device 32 has received the vehicle wireless connection identifier and is attempting to establish a wireless connection with the controller 14. If no incoming wireless connection request is received, the method 100 proceeds to enter the standby state at block 112. If the incoming wireless connection request is received, the method 100 proceeds to block 150.

At block 150, the controller 14 confirms a vehicle wireless connection passcode. In the scope of the present disclosure, the vehicle wireless connection passcode is an alphanumeric or numeric sequence of characters and/or digits. The vehicle wireless connection passcode is used to confirm that the mobile device 32 is connecting to the controller 14, rather than another device. The vehicle wireless connection passcode is computed by the controller 14 based on messages exchanged between the controller 14 and the mobile device 32 using the vehicle communication system 16. Likewise, the mobile device 32 computes a mobile device wireless connection passcode based on messages exchanged between the controller 14 and the mobile device 32 using the vehicle communication system 16. In an exemplary embodiment, the vehicle wireless connection passcode and/or the mobile device wireless connection passcode is computed using a Diffie—Hellman key exchange. When the incoming connection request is received, the controller 14 provides the vehicle wireless connection passcode and the mobile device 32 provides the mobile device wireless connection passcode. If the vehicle wireless connection passcode is identical to the mobile device wireless connection passcode, the vehicle wireless connection passcode is confirmed. The present disclosure contemplates at least five alternative methods 150*a*, 150*b*, 150*c*, 150*d*, 150*e* for confirming the vehicle wireless connection passcode, as will be discussed in reference to FIGS. 5A-5E below.

Figure 5A:
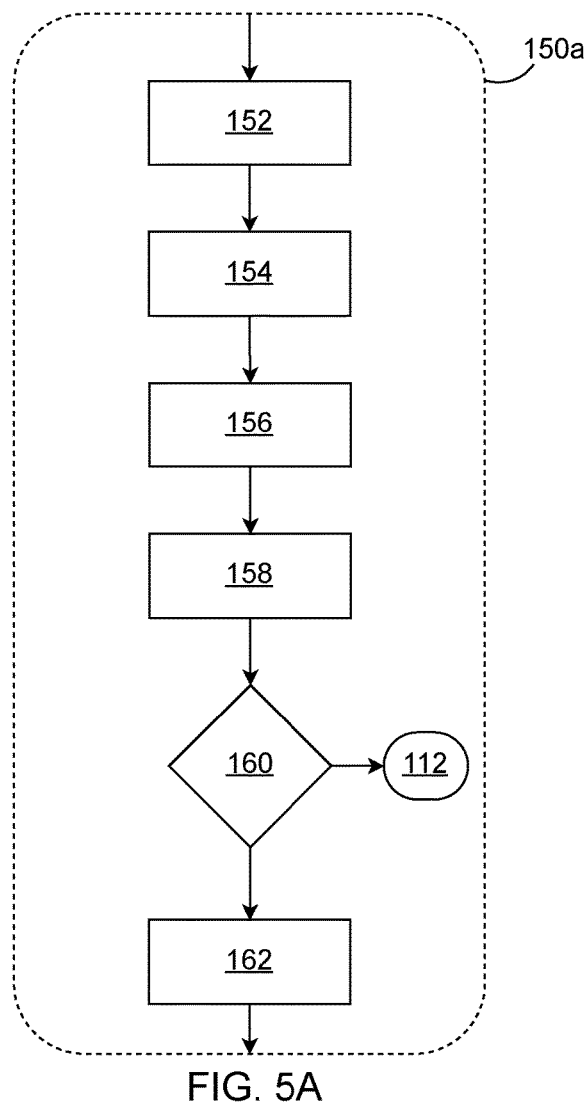
FIG. 5A is a flowchart of a first method for confirming a vehicle wireless connection passcode according to an exemplary embodiment.

Referring to FIG. 5A, a flowchart of a first method 150*a* for block 150 is shown. The first method 150*a* begins at block 152. At block 152, the controller 14 retrieves the vehicle wireless connection passcode from the media 28 of the controller 14. After block 152, the first method 150*a* proceeds to block 154.

At block 154, the controller 14 synthesizes an artificial human speech segment including the vehicle wireless connection passcode. In the scope of the present disclosure, the artificial human speech segment is an audio file containing computer-synthesized speech. In an exemplary embodiment, the speech segment is generated using a speech synthesis algorithm. In a non-limiting example, the speech synthesis algorithm may concatenate segments of recorded human speech which are stored in the media 28 of the controller 14. After block 154, the first method 150*a* proceeds to block 156. At block 156, the artificial human speech segment synthesized at block 154 is announced using the speaker 20. After block 156, the first method 150*a* proceeds to block 158.

At block 158, the controller 14 prompts the occupant to provide a matching status of the vehicle wireless connection passcode. In the scope of the present disclosure, the matching status defines whether the vehicle wireless connection passcode announced at block 156 is identical to the mobile device wireless connection passcode provided by the mobile device 32. In an exemplary embodiment, the controller 14 prompts the occupant to provide the matching status by displaying a prompt on the HMI 22. In another exemplary embodiment, the controller 14 prompts the occupant to provide the matching status using the speaker 20 (i.e., an audible prompt) and the controller 14 receives the matching status using the microphone 18. In yet another exemplary embodiment, the mobile device 32 is configured to receive the vehicle wireless connection passcode announced at block 156 using a microphone of the mobile device 32, compare the received vehicle wireless connection passcode to the mobile device wireless connection passcode, and transmit the matching status to the controller 14. After block 158, the first method 150*a* proceeds to block 160.

At block 160, if the vehicle wireless connection passcode is not identical to the mobile device wireless connection passcode, the first method 150*a* proceeds to enter the standby state at block 112. If the vehicle wireless connection passcode is identical to the mobile device wireless connection passcode, the first method 150*a* proceeds to block 162. At block 162, the vehicle wireless connection passcode is confirmed.

Figure 5B:
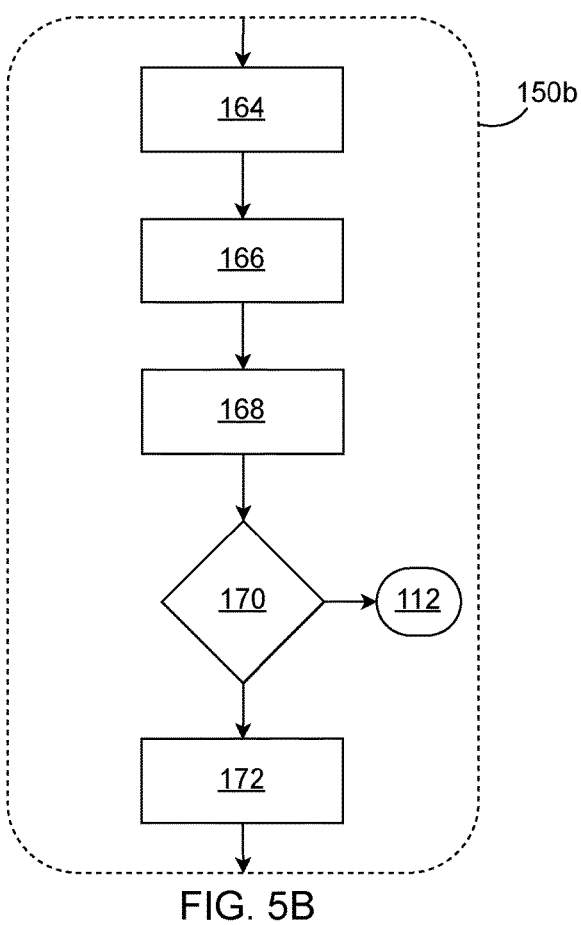
FIG. 5B is a flowchart of a second method for confirming a vehicle wireless connection passcode according to an exemplary embodiment.

Referring to FIG. 5B, a flowchart of a second method 150*b* for block 150 is shown. The second method 150*b* begins at block 164. At block 164, the controller 14 retrieves the vehicle wireless connection passcode from the media 28 of the controller 14. After block 164, the second method 150*b* proceeds to block 166.

At block 166, the controller 14 uses the microphone 18 to receive the mobile device wireless connection passcode. In an exemplary embodiment, the mobile device 32 is configured to announce the mobile device wireless connection passcode using a speaker of the mobile device 32. In a non-limiting example, the mobile device 32 may synthesize artificial human speech to announce the mobile device wireless connection passcode. In a further non-limiting example, the mobile device 32 emits a pattern of tones and/or pitched noises using the speaker of the mobile device 32 to transmit the mobile device wireless connection passcode to the controller 14. After block 166, the second method 150*b* proceeds to block 168.

At block 168, the controller 14 compares the vehicle wireless connection passcode retrieved at block 164 to the mobile device wireless connection passcode received at block 166. After block 168, the second method 150*b* proceeds to block 170.

At block 170, if the vehicle wireless connection passcode is not identical to the mobile device wireless connection passcode, the second method 150*b* proceeds to enter the standby state at block 112. If the vehicle wireless connection passcode is identical to the mobile device wireless connection passcode, the second method 150b proceeds to block 134. At block 134, the vehicle wireless connection passcode is confirmed.

Figure 5C:
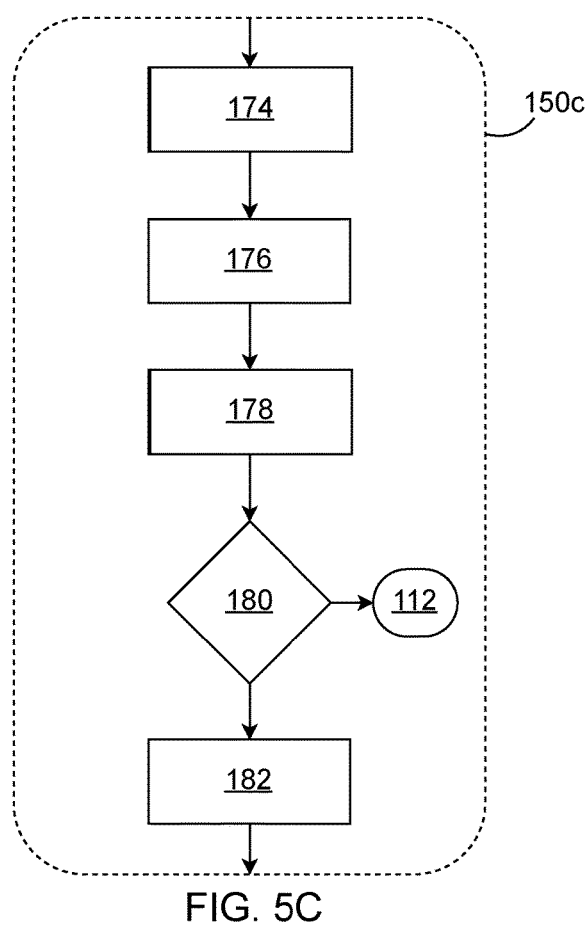
FIG. 5C is a flowchart of a third method for confirming a vehicle wireless connection passcode according to an exemplary embodiment.

Referring to FIG. 5C, a flowchart of a third method 150c for block 150 is shown. The third method 150c begins at block 174. At block 174, the controller 14 retrieves the vehicle wireless connection passcode from the media 28 of the controller 14. After block 174, the third method 150c proceeds to block 176.

At block 176, the controller 14 uses the NFC transceiver 48 to transmit the vehicle wireless connection passcode to the mobile device 32. In an exemplary embodiment, the mobile device 32 is configured to receive the vehicle wireless connection passcode, compare the received vehicle wireless connection passcode to the mobile device wireless connection passcode, and transmit the matching status to the controller 14 using near-field communication. After block 176, the third method 150c proceeds to block 178.

At block 178, the controller 14 receives the matching status from the mobile device 32 using the NFC transceiver 48. After block 178, the third method 150c proceeds to block 180.

At block 180, if the matching status received at block 140 is the non-identical status, the third method 150c proceeds to enter the standby state at block 112. If the matching status received at block 140 is the identical status, the third method 150c proceeds to block 182. At block 182, the vehicle wireless connection passcode is confirmed.

Figure 5D:
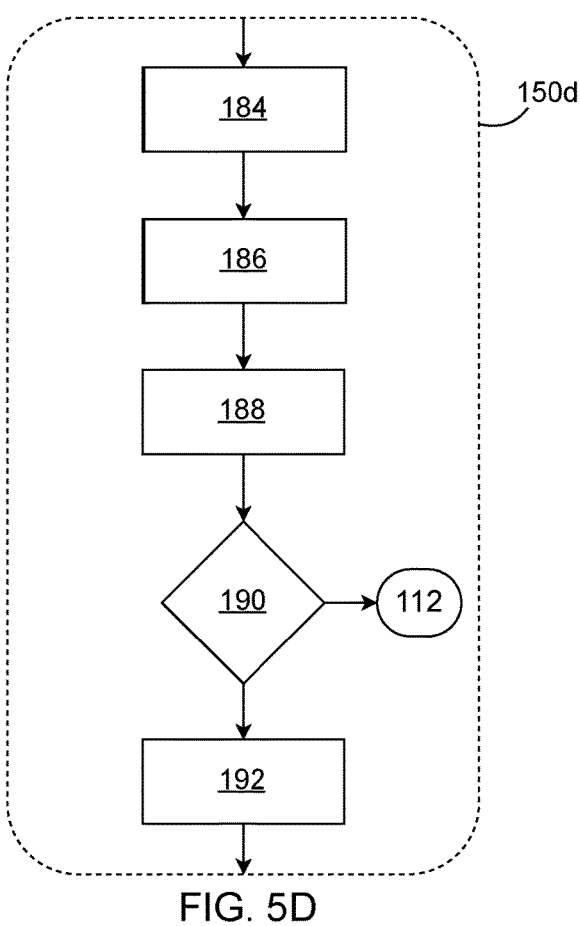
FIG. 5D is a flowchart of a fourth method for confirming a vehicle wireless connection passcode according to an exemplary embodiment.

Referring to FIG. 5D, a flowchart of a fourth method 150d for block 150 is shown. The fourth method 150d begins at block 184. At block 184, the controller 14 retrieves the vehicle wireless connection passcode from the media 28 of the controller 14. After block 184, the fourth method 150d proceeds to block 186.

At block 186, the controller 14 uses the refreshable braille display (RBD) 24 to display the vehicle wireless connection passcode retrieved at block 184. After block 186, the fourth method 150d proceeds to block 188.

At block 188, the controller 14 prompts the occupant to provide a matching status of the vehicle wireless connection passcode. In an exemplary embodiment, the controller 14 prompts the occupant to provide the matching status by displaying a prompt on the HMI 22. In another exemplary embodiment, the controller 14 prompts the occupant to provide the matching status using the speaker 20 (i.e., an audible prompt) and the controller 14 receives the matching status using the microphone 18. In yet another exemplary embodiment, the controller 14 prompts the occupant to provide the matching status by displaying a prompt on the RBD 24. After block 188, the fourth method 150d proceeds to block 190.

At block 190, if the matching status received at block 188 is the non-identical status, the fourth method 150d proceeds to enter the standby state at block 112. If the matching status received at block 188 is the identical status, the fourth method 150d proceeds to block 192. At block 192, the vehicle wireless connection passcode is confirmed.

Figure 5E:
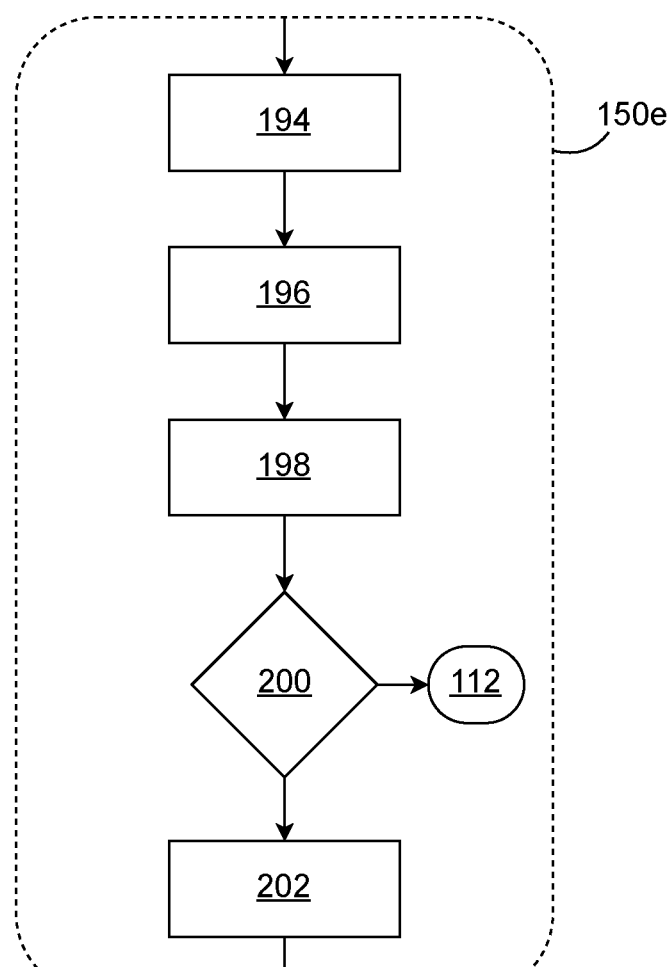
FIG. 5E is a flowchart of a fifth method for confirming a vehicle wireless connection passcode according to an exemplary embodiment.

Referring to FIG. 5E, a flowchart of a fifth method 150e for block 150 is shown. The fifth method 150e begins at block 194. At block 194, the controller 14 retrieves the vehicle wireless connection passcode from the media 28 of the controller 14. After block 194, the fifth method 150e proceeds to block 196.

At block 196, the controller 14 generates an image which encodes the vehicle wireless connection passcode retrieved at block 194. In an exemplary embodiment, the image is a one- or two-dimensional barcode (e.g., a QR code). After block 196, the fifth method 150e proceeds to block 198.

At block 198, the controller 14 displays the image generated at block 196 using the HMI 22. In an exemplary embodiment, the mobile device 32 is configured to decode the image using the camera of the mobile device 32, thus obtaining the vehicle wireless connection passcode. Subsequently, the mobile device 32 is configured to compare the decoded vehicle wireless connection passcode to the mobile device wireless connection passcode and transmit the matching status to the controller 14. After block 198, the fifth method 150e proceeds to block 200.

At block 200, if the matching status received at block 198 is the non-identical status, fifth method 150e proceeds to enter the standby state at block 112. If the matching status received at block 198 is the identical status, the fifth method 150e proceeds to block 202. At block 202, the vehicle wireless connection passcode is confirmed.

Referring again to FIG. 2, after preforming at least one of the alternative methods 150a, 150b, 150c, 150d, 150e at block 150, the method 100 proceeds to block 204.

At block 204, the controller 14 establishes the wireless connection between the controller 14 and the mobile device 32 using the wireless connection transceiver 30.

In an exemplary embodiment, the controller 14 repeatedly exits the standby state 112 and restarts the method 100 at block 102. In a non-limiting example, the controller 14 exits the standby state 112 and restarts the method 100 on a timer, for example, every three hundred milliseconds.

The system and method of the present disclosure offer several advantages. By providing alternative methods of interaction such as, for example, auditory feedback, visually-impaired occupants may more easily establish a connection between the mobile device 32 and the vehicle 12. Additionally, using alternative methods of interaction such as, for example, near-field communication simply the connection process and thus improve the user experience of occupants.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system for establishing a wireless connection between a mobile device and a vehicle, the system comprising:
   a human-machine interface (HMI);
   a vehicle communication system, wherein the vehicle communication system includes a wireless connection transceiver;
   a speaker;
   a microphone;
   a controller in electrical communication with the HMI, the vehicle communication system, the speaker, and the microphone, wherein the controller is programmed to:
      activate a wireless connection mode of the controller based at least in part on a signal from the microphone;
      retrieve a vehicle wireless connection identifier from a non-transitory memory of the controller;
      synthesize an artificial human speech segment including the vehicle wireless connection identifier;
      announce the artificial human speech segment including the vehicle wireless connection identifier to an occupant of the vehicle using the speaker;

confirm a vehicle wireless connection passcode using at least one of the speaker and the microphone; and
establish a wireless connection between the mobile device and the controller using the wireless connection transceiver in response to confirming the vehicle wireless connection passcode.

2. The system of claim 1, wherein to activate the wireless connection mode of the controller, the controller is further programmed to:
receive the signal from the microphone;
analyze the signal from the microphone to identify a voice command spoken by an occupant of the vehicle;
determine a requested action based on the voice command spoken by the occupant of the vehicle; and
activate the wireless connection mode of the controller in response to determining that the requested action includes activation of the wireless connection mode of the controller.

3. The system of claim 1, wherein to confirm the vehicle wireless connection passcode, the controller is further programmed to:
compute the vehicle wireless connection passcode;
synthesize an artificial human speech segment including the vehicle wireless connection passcode;
announce the artificial human speech segment including the vehicle wireless connection passcode using the speaker;
determine a matching status between the vehicle wireless connection passcode and a mobile device wireless connection passcode, wherein the matching status includes an identical status and a non-identical status; and
confirm the vehicle wireless connection passcode in response to determining that the matching status is the identical status.

4. The system of claim 3, wherein to determine the matching status, the controller is further programmed to:
prompt an occupant of the vehicle to provide the matching status of the vehicle wireless connection passcode and the mobile device wireless connection passcode.

5. The system of claim 3, wherein to determine the matching status, the mobile device is configured to compare the vehicle wireless connection passcode to the mobile device wireless connection passcode to determine the matching status.

6. The system of claim 1, wherein to confirm the vehicle wireless connection passcode, the controller is further programmed to:
compute the vehicle wireless connection passcode;
receive a mobile device wireless connection passcode using the microphone;
determine a matching status between the vehicle wireless connection passcode and the mobile device wireless connection passcode by comparing the vehicle wireless connection passcode to the mobile device wireless connection passcode, wherein the matching status includes an identical status and a non-identical status; and
confirm the vehicle wireless connection passcode in response to determining that the matching status is the identical status.

7. A system for establishing a wireless connection between a mobile device and a vehicle, the system comprising:
a human-machine interface (HMI);
a vehicle communication system, wherein the vehicle communication system includes a wireless connection transceiver and a universal serial bus (USB) interface; and
a controller in electrical communication with the HMI and the vehicle communication system, wherein the controller is programmed to:
monitor a mobile device connection status of the USB interface, wherein the mobile device connection status includes a connected status and disconnected status;
transmit a user interface of the HMI to the mobile device using the USB interface in response to determining that the mobile device connection status is the connected status;
activate a wireless connection mode of the controller based at least in part on a signal transmitted by the mobile device using the USB interface;
transmit a vehicle wireless connection identifier using the vehicle communication system;
confirm a vehicle wireless connection passcode using the vehicle communication system; and
establish a wireless connection between the mobile device and the controller using the wireless connection transceiver in response to confirming the vehicle wireless connection passcode.

8. The system of claim 7, wherein the mobile device is configured to display the user interface of the HMI transmitted using the USB interface.

9. The system of claim 7, wherein to activate the wireless connection mode of the controller, the controller is further programmed to:
monitor a portion of a touchscreen of the HMI; and
activate the wireless connection mode of the controller in response to detecting a predetermined number of touches in the portion of the touchscreen of the HMI.

10. The system of claim 7, wherein the vehicle communication system further includes a universal serial bus (USB) interface, and wherein to activate the wireless connection mode of the controller, the controller is further programmed to:
monitor a mobile device connection status of the USB interface, wherein the mobile device connection status includes a connected status and disconnected status; and
activate the wireless connection mode of the controller in response to determining that the mobile device connection status is the connected status.

11. The system of claim 7, wherein the vehicle communication system further includes a near-field communication (NFC) transceiver, and wherein to transmit the vehicle wireless connection identifier, the controller is further programmed to:
transmit the vehicle wireless connection identifier to the mobile device using the NFC transceiver.

12. The system of claim 7, wherein the vehicle communication system further includes a near-field communication (NFC) transceiver, and wherein to confirm the vehicle wireless connection passcode, the controller is further programmed to:
transmit the vehicle wireless connection passcode to the mobile device using the NFC transceiver;
determine a matching status between the vehicle wireless connection passcode and a mobile device wireless connection passcode, wherein the matching status includes an identical status and a non-identical status; and confirm the vehicle wireless connection passcode in response to determining that the matching status is the identical status.

13. The system of claim 12, wherein to determine the matching status, controller is further programmed to:
receive the matching status from the mobile device using the NFC transceiver, wherein the mobile device is configured to determine the matching status by comparing the vehicle wireless connection passcode to the mobile device wireless connection passcode and transmit the matching status to the NFC transceiver.

14. The system of claim 7, wherein the vehicle communication system further includes a refreshable braille display, and wherein to confirm the vehicle wireless connection passcode, the controller is further programmed to:
display the vehicle wireless connection passcode on the refreshable braille display;
determine a matching status of the vehicle wireless connection passcode and a mobile device wireless connection passcode, wherein the matching status includes an identical status and a non-identical status; and
confirm the vehicle wireless connection passcode in response to determining that the matching status is the identical status.

15. The system of claim 14, wherein to determine the matching status, the controller is further programmed to:
prompt an occupant of the vehicle to provide the matching status of the vehicle wireless connection passcode and the mobile device wireless connection passcode.

16. A method for establishing a wireless connection between a mobile device and a vehicle, the method comprising:
activating a wireless connection mode of the vehicle based on a signal from a universal serial bus (USB) interface of the vehicle;
transmitting a vehicle wireless connection identifier to the mobile device using a touchscreen of the vehicle in response to activating the wireless connection mode of the vehicle;
monitoring a wireless connection transceiver for an incoming wireless connection request;
transmitting a vehicle wireless connection passcode to the mobile device using the touchscreen of the vehicle in response to receiving an incoming wireless connection request, wherein transmitting the vehicle wireless connection passcode to the mobile device further comprises:
displaying an image on the touchscreen of the vehicle in response to receiving an incoming wireless connection request from the mobile device, wherein the image encodes the vehicle wireless connection passcode; and
receiving the vehicle wireless connection passcode using a camera of the mobile device;
confirming the vehicle wireless connection passcode using the mobile device, wherein confirming the vehicle wireless connection passcode using the mobile device further comprises:
comparing the vehicle wireless connection passcode to a mobile device wireless connection passcode; and
establishing a wireless connection between the mobile device and the vehicle in response to confirming the vehicle wireless connection passcode wherein establishing the wireless connection between the mobile device and the vehicle further comprises:
establishing the wireless connection between the vehicle and the mobile device in response to determining that the vehicle wireless connection passcode is identical to the mobile device wireless connection passcode.

17. The method of claim 16, wherein:
activating the wireless connection mode of the vehicle further comprises:
transmitting a user interface of the vehicle to a mobile device using a universal serial bus (USB) interface; and
displaying the user interface of the vehicle on the mobile device, wherein a user may interact with the user interface to activate a wireless connection mode of the vehicle; and
transmitting the vehicle wireless connection identifier to the mobile device further comprises:
displaying a wireless connection identifier on a touchscreen of the vehicle in response to the user activating the wireless connection mode of the vehicle; and
receiving the vehicle wireless connection identifier on the mobile device using a camera of the mobile device.

* * * * *